(12) United States Patent
Lin et al.

(10) Patent No.: US 8,379,320 B2
(45) Date of Patent: Feb. 19, 2013

(54) LENS MODULE AND PROJECTION DEVICE USING THE SAME

(75) Inventors: Chih-Chien Lin, Hsin-Chu (TW); Kang-Hsi Li, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 0 days.

(21) Appl. No.: 13/191,607

(22) Filed: Jul. 27, 2011

(65) Prior Publication Data

US 2012/0127592 A1    May 24, 2012

(30) Foreign Application Priority Data

Nov. 19, 2010    (TW) ................................ 99222547 U

(51) Int. Cl.
*G02B 15/14* (2006.01)
*G02B 7/02* (2006.01)
(52) U.S. Cl. .......................... 359/696; 359/699; 359/824

(58) Field of Classification Search .......... 359/694–704, 359/811–830
See application file for complete search history.

(56) References Cited

U.S. PATENT DOCUMENTS
2006/0066819 A1*    3/2006   Wang et al. .................... 353/99

FOREIGN PATENT DOCUMENTS
TW            201011366        3/2010

* cited by examiner

*Primary Examiner* — Mohammed Hasan
(74) *Attorney, Agent, or Firm* — WPAT PC; Justin King

(57) ABSTRACT

A lens module includes a lens, a cam and an actuator. The lens has two driven parts disposed at one side of the lens. The cam is disposed beside the lens and has a rotation shaft and two cam surfaces, and a portion of the cam is located between the two driven parts. The two cam surfaces have the same shape and are on opposite sides of the cam. The two cam surfaces are in contact with the two driven parts respectively. The actuator is coupled with the rotation shaft and adapted to rotate the cam.

10 Claims, 10 Drawing Sheets

420'

420"

LENS MODULE AND PROJECTION DEVICE USING THE SAME

FIELD OF THE INVENTION

The invention relates to a lens module, and more particularly to a lens module with an actuator and a projection device using the lens module.

BACKGROUND OF THE INVENTION

FIG. 1 is a schematic view of a conventional lens module. Referring to FIG. 1, the conventional lens module 100 includes a lens 110 and a focus wheel 120. The focus wheel 120 can be rotated in a clockwise direction or a counter-clockwise direction, so that the lens 110 can be moved forward or backward along a predetermined direction E1 to achieve the purpose of focusing. However, the above focus control mode is a manual focus control mode and the use of the lens module 100 is inconvenient.

FIG. 2A is a schematic view of another conventional lens module. FIG. 2B is an exploded schematic view of the lens module of FIG. 2A. Referring to FIGS. 2A and 2B, Taiwan Publication Patent No. 201011366 has disclosed the lens module 20. The lens module 20 includes an outer lens barrel 210, an inner lens barrel 220 and a lens 230. The outer lens barrel 210 has a guide slot 212 and a cam groove 213. The inner lens barrel 220 has a cam pole 221 and a restricting slot 223 corresponding to the cam groove 213. The lens 230 is disposed in the inner lens barrel 220. In the lens module 20, the lens 230 is moved by the outer lens barrel 210 cooperative with the inner lens barrel 220 to achieve the purpose of focusing. However, the above focus control mode is also the manual focus control mode and the use of the lens module 20 is inconvenient.

FIG. 3 is a schematic view of another conventional lens module. The conventional lens module 300 includes a lens 310, a motor 320, a screw 330 and two rods 340. The lens 310 is coupled with the two rods 340, so that the lens 310 can be moved along the two rods 340. The motor 320 is used to drive the screw 330 to rotate, and the lens 310 is further coupled with the screw 330. When the screw 330 is rotated in a clockwise direction or a counter-clockwise direction by the motor 320, the screw 330 can move the lens 310 forward or backward along a predetermined direction E2 to achieve the purpose of focusing.

In comparison with the manual focus control mode, the lens module 300 can be used conveniently due to its automatic focus control mode. However, when the lens module 300 is focused, an actual position can not be determined, and the lens 310 is easily to be moved beyond safe limit. As such, the lens 310 may impact other components, so the lens 310 and the motor 320 are easily damaged.

For overcoming the above shortcomings, the lens module 300 can further include a sensor to sense the actual position of the lens 310. However, the use of the sensor would increase the volume and cost of the lens module 300. Furthermore, the sensor may have the shortcomings of low sensitivity and accuracy, and therefore the production yield and reliability of the lens module 300 would be decreased.

SUMMARY OF THE INVENTION

The invention provides a lens module, which can perform automatic focusing control and have an improved reliability.

The invention also provides a projection device. The projection device can have an improved reliability.

The other objects and advantages of the invention will be further understood after reviewing the following embodiments of the invention.

To achieve at least one of the above-mentioned advantages or other advantages, the invention provides a lens module. The lens module includes a lens, a cam and an actuator. The lens has two driven parts disposed at one side of the lens. The cam is disposed beside the lens and has a rotation shaft and two cam surfaces, and a portion of the cam is located between the two driven parts. The two cam surfaces have the same shape and are on opposite sides of the cam, and the two cam surfaces are in contact with the two driven parts respectively. The actuator is coupled with the rotation shaft and adapted to rotate the cam.

In an embodiment of the invention, each of the cam surfaces is consistent with a formula $S=A|\cos T\,(2\pi X+\pi)|$, wherein S is a trajectory along a perimeter of the cam surface, A is a difference between a high level and a low level of the trajectory, Cos is a cosine function, $\pi$ is a ratio of the circumference of a circle to its diameter, T is a number of cycles of the trajectory, X is a parameter, and $0 \leq X \leq 1$.

In an embodiment of the invention, the lens module further includes a guiding structure, and the lens is coupled with the guiding structure and adapted to be moved along the guiding structure.

In an embodiment of the invention, the guiding structure includes two rods parallel with each other.

In an embodiment of the invention, the guiding structure is parallel with the rotation shaft of the cam.

In an embodiment of the invention, the actuator is a stepper motor, a direct current motor or a voice coil motor.

In an embodiment of the invention, each of the driven parts is a protrusion structure.

To achieve at least one of the above-mentioned advantages or other advantages, the invention provides a projection device. The projection device includes an illumination system, a light valve and a lens module. The illumination system is adapted to provide an illumination light beam. The light valve is disposed on a transmission path of the illumination light beam and adapted to convert the illumination light beam into an image light beam. The lens module is disposed on a transmission path of the image light beam.

In the lens module of the invention, the actuator can drive the cam to rotate, and the driven parts of the lens can be moved by the rotated cam, so that the lens can be moved forward or backward in a predetermined range. As such, the lens may not impact other components, and thus the reliability of the lens module and the projection device of the invention can be improved.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
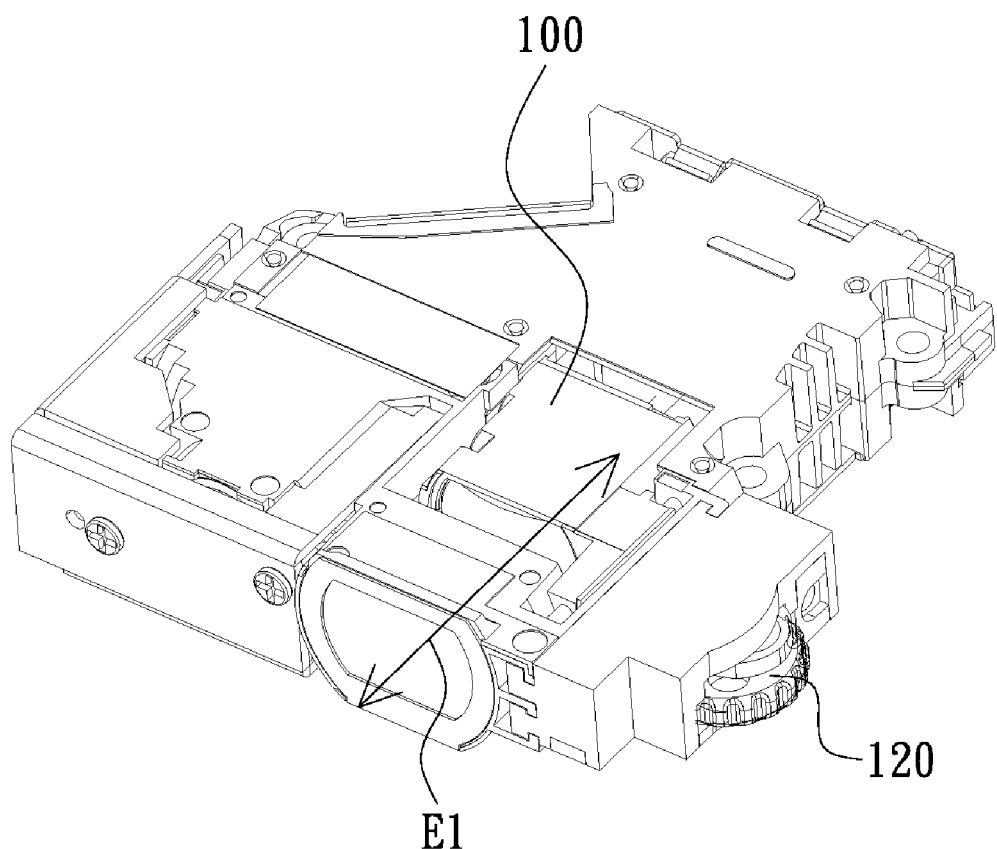
FIG. 1 is a schematic view of a conventional lens module.
Figure 2A:
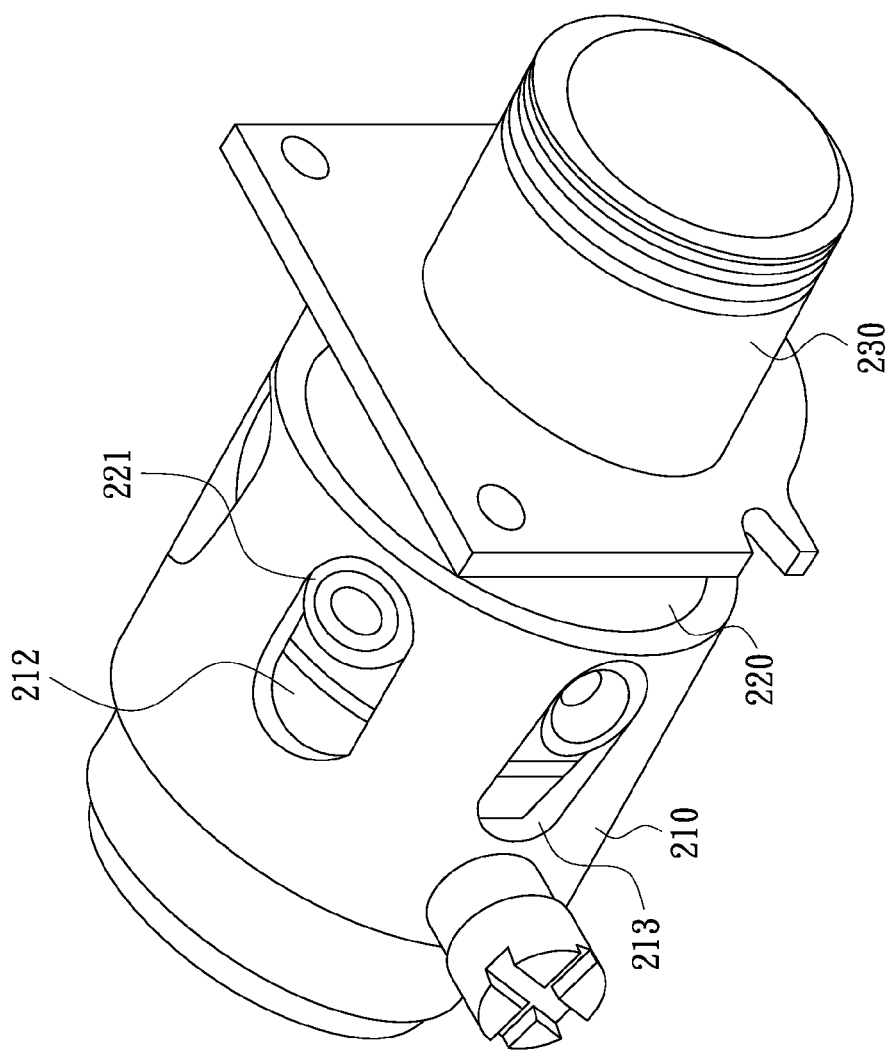
FIG. 2A is a schematic view of another conventional lens module.
Figure 2B:
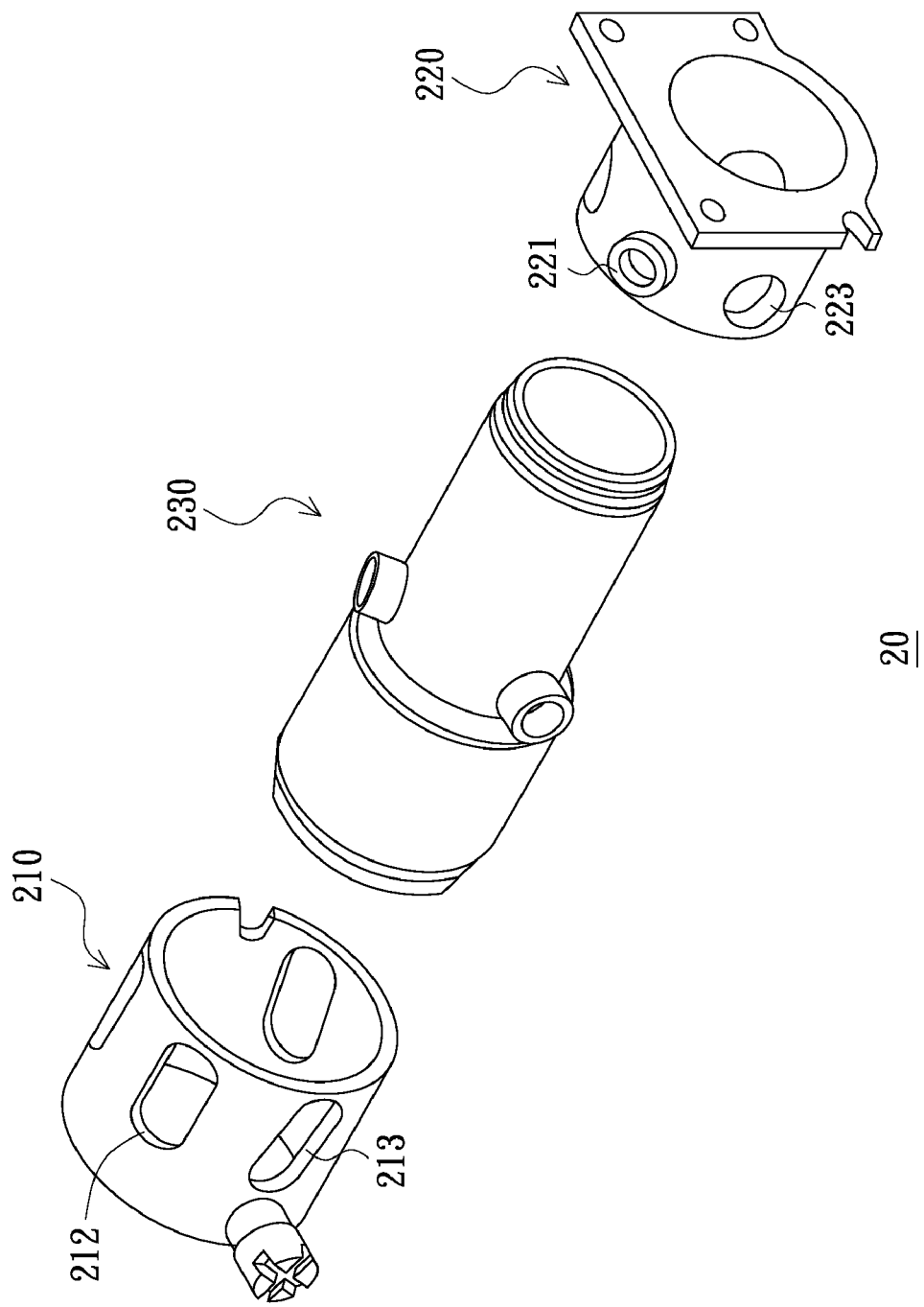
FIG. 2B is an exploded schematic view of the lens module of FIG. 2A.
Figure 3:
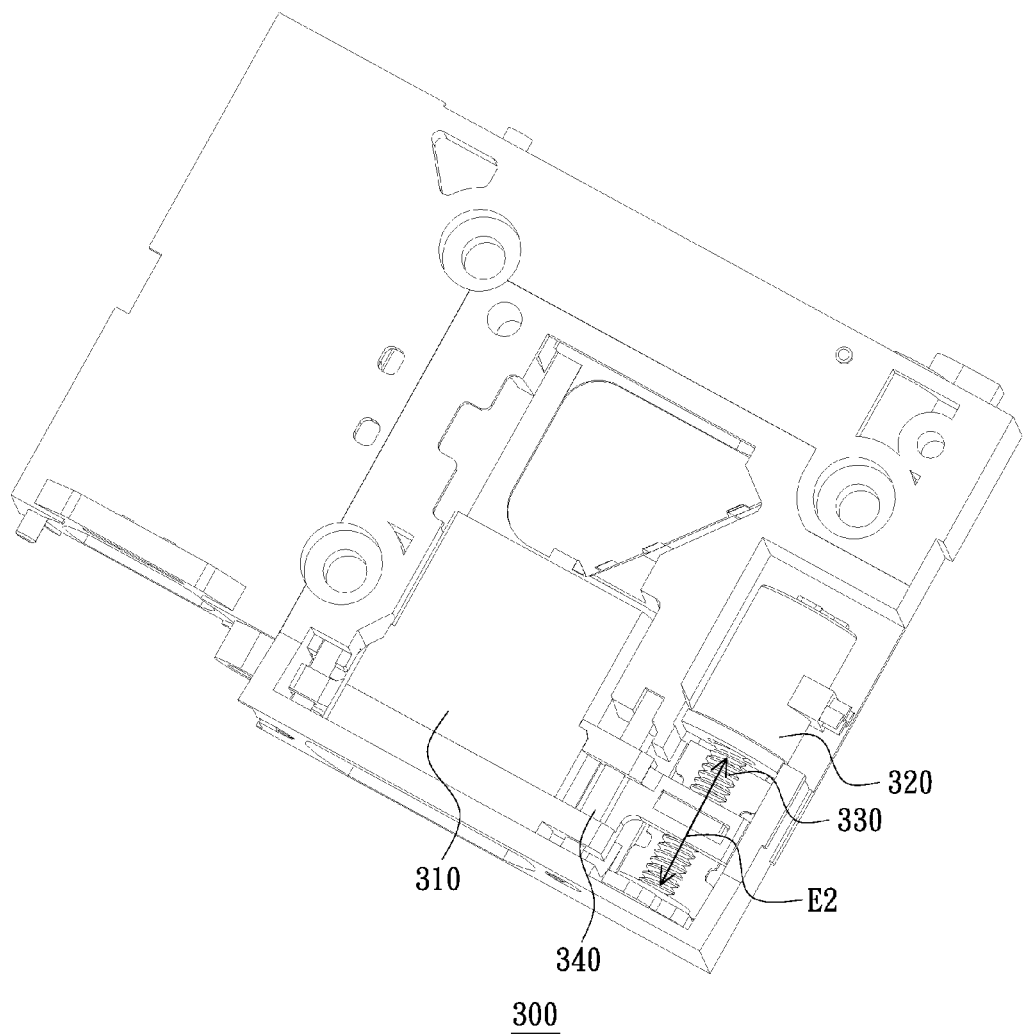
FIG. 3 is a schematic view of another conventional lens module.
Figure 4:
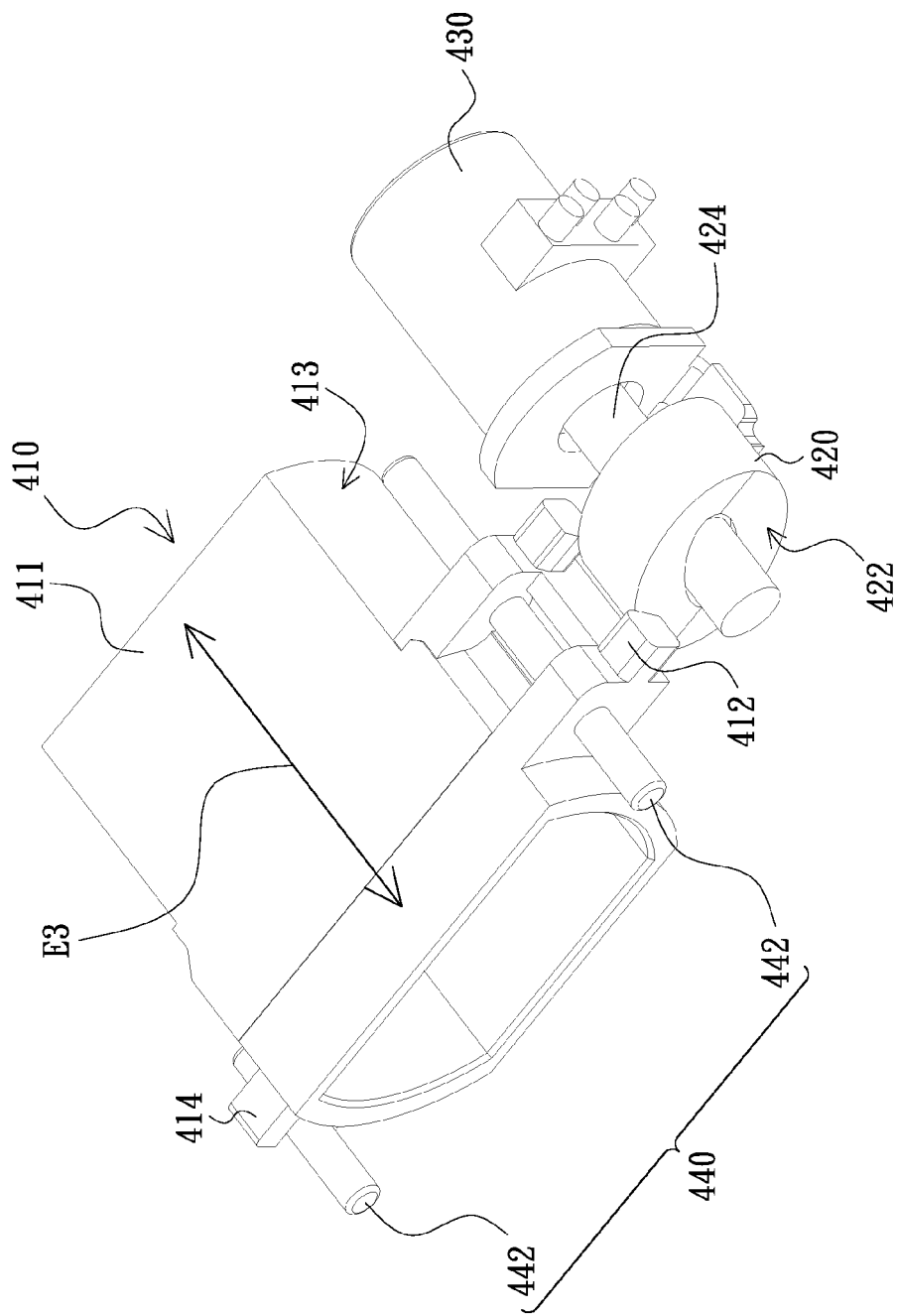
FIG. 4 is a schematic view of a lens module according to an embodiment of the invention.

FIG. 4 is a schematic view of a lens module according to an embodiment of the invention. The lens module 400 of the embodiment includes a lens 410, a cam 420 and an actuator 430. The lens 410 has two driven parts 412 disposed at one side of the lens 410. The cam 420 is disposed beside the lens 410. A portion of the cam 420 is located between the two driven parts 412. The cam 420 has two cam surfaces 422 and a rotation shaft 424. The two cam surfaces 422 have the same shape and are on opposite sides of the cam 420. The two cam surfaces 422 are in contact with the two driven parts 412 respectively. The actuator 430 is coupled with the rotation shaft 424 of the cam 420 and adapted to rotate the cam 420.

The lens 410 can include a housing 411 and optical lenses (not shown) located in the housing 411. The two driven parts 412 are disposed at one side 413 of the housing 411. The actuator 430 can be a stepper motor, a direct current motor, a voice coil motor or other suitable actuator. The two driven parts 412 can be protrusion structures respectively. When the cam 420 is rotated by the actuator 430, the cam surfaces 422 of the cam 420 would move the driven parts 412 due to a trajectory change of the cam surfaces 422. As such, the lens 410 can be moved forward or backward along a predetermined direction E3. In addition, to make the lens 410 can be moved steadily, the lens module 400 can further include a guiding structure 440. The lens 410 is coupled with the guiding structure 440 and can be moved along the guiding structure 440. In the embodiment, the guiding structure 440 can include two rods 442 parallel with each other. The guiding structure 440 can be parallel with the rotation shaft 424 of the cam 420. It should be understood that, the guiding structure 440 is not limited herein. In other embodiments, the guiding structure 440 can be a guiding groove, a guiding protrusion or other suitable guiding structure, but a joint 414 of the housing 411 should be able to engage with the guiding structure 440.

Figure 5:
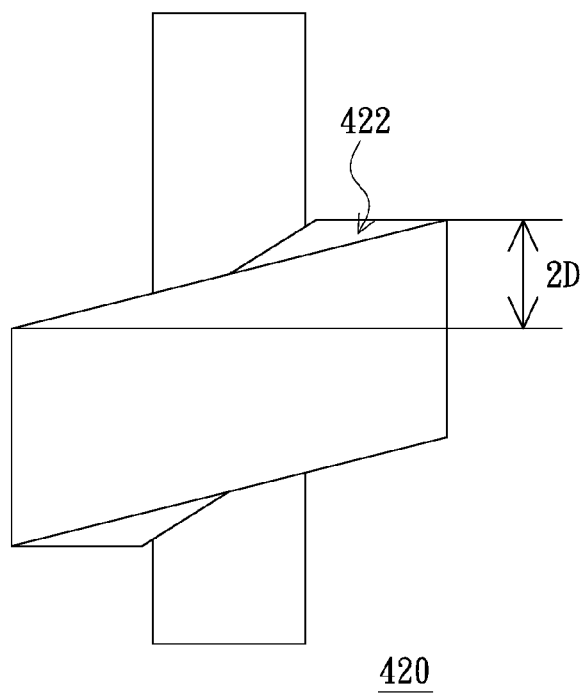
FIG. 5 is a schematic view of a cam according to an embodiment of the invention.
Figure 6:
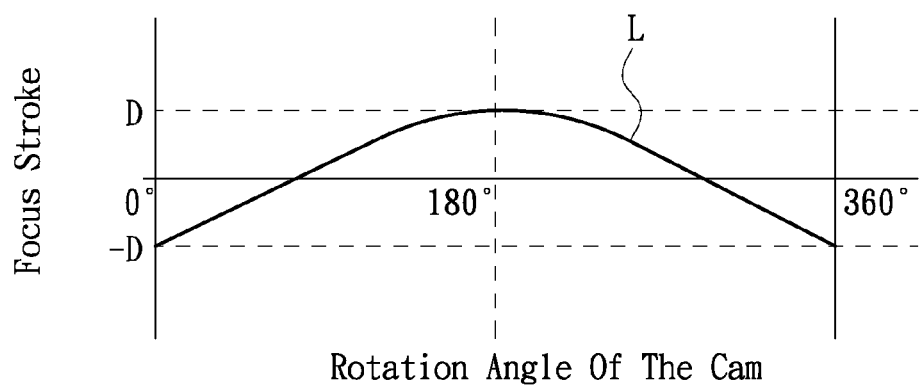
FIG. 6 is a diagram of a trajectory of a cam surface of the cam of FIG. 5.

FIG. 5 is a schematic view of a cam according to an embodiment of the invention. FIG. 6 is a diagram of a trajectory of a cam surface of the cam of FIG. 5. Referring to FIGS. 5 and 6, in the embodiment, each of the cam surfaces 422 is consistent with a formula S=A|Cos T (2πX+π)|, wherein S is a trajectory along a perimeter of the cam surface 422, and the curve L in FIG. 6 represents the trajectory. A is a difference between a high level and a low level of the trajectory, and that is, the maximum minuses the minimum in a focus stroke. In the embodiment, the difference between the high level and the low level of the trajectory is, for example, 2D. Cos is a cosine function. π is a ratio of the circumference of the circle to its diameter. T is a number of cycles of the trajectory. For example, when T is equal to 1 (as shown in FIG. 6) and the cam 420 is rotated around once, the maximum and the minimum would appear once respectively in the focus stroke. In addition, X is a parameter and 0≦X≦1, wherein X represents a position on a lateral axis that corresponds to a point on the curve L in FIG. 6. When X is equal to 0, a rotation angle of the cam 420 is 0 degree. When X is equal to 1, the rotation angle of the cam 420 is 360 degrees. When X is equal to 0.5, the rotation angle of the cam 420 is 180 degrees.

Figure 7C:
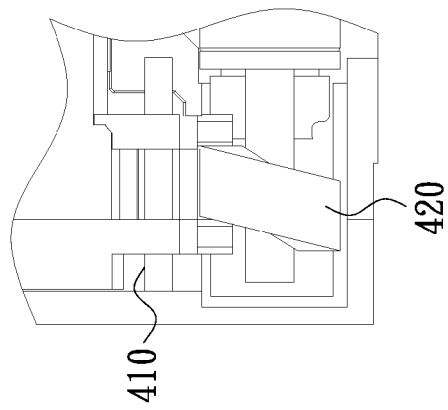
FIGS. 7A to 7C are schematic views of rotation angles of the cam and movement of the lens according to an embodiment of the invention.
Figure 7B:
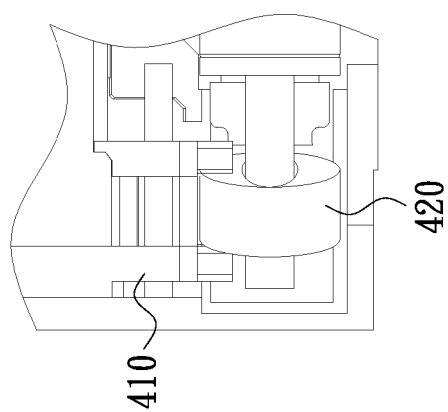
Figure 7A:
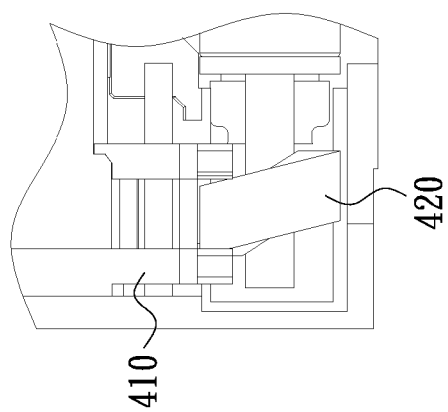

FIGS. 7A to 7C are schematic views of rotation angles of the cam and movement of the lens according to an embodiment of the invention. Referring to FIG. 7A, in the embodiment, when the rotation angle of the cam 420 is 0 degree, the lens 410 is located at a first end. The first end is adjacent to the left side of FIG. 7A. When the cam 420 is rotated, the lens 410 would be moved toward the right side of the FIG. 7A by the cam 420. Referring to FIG. 7B, the position of the lens 410 is shown while the cam 420 is rotated for 90 degrees. Referring to FIG. 7C, when the rotation angle of the cam 420 is 180 degrees, the lens 410 is located at a second end. The second end is adjacent to the right side of the FIG. 7C. When the cam 420 of FIG. 7C is continuously rotated, the lens 410 would be moved toward the left side of FIG. 7C by the cam 420. When the rotation angle of the cam 420 is 270 degrees, the position of the lens 410 is the same to that when the rotation angle of the cam 420 is 90 degrees. When the rotation angle of the cam 420 is 360 degrees, the lens 410 returns to the first end. As mentioned above, in the embodiment, when the cam 420 is rotated around once, the lens would be moved back-and-forth once in the predetermined range.

In the lens module 400 of the embodiment, the lens 410 is moved by the cam 420 and the movement of the lens 410 is conditioned to a predetermined range. As such, the lens 410 would not be moved beyond the predetermined range, and other components would not be impacted by the lens 410. Thus, the lens 410 or the actuator 430 can be prevented from damage. In comparison with the prior art, the lens module 400 of the embodiment can not include a sensor, so the lens module 400 has the advantages of simple structure and low cost. In addition, the cam surface 422 of the cam 420 can contact with the driven parts 412 of the lens 410 with a simple manner, so a complicated contact manner is not needed and thus the lens module 400 can be assembled easily. The movement of the lens 410 can be controlled accurately by the cam surface 422, so a path of the movement of the lens 410 is not easily to be changed even if they are used for a long time. Furthermore, the actuator 430 can rotate along the single direction to move the lens 410 forward or backward, and therefore the rotation direction of the actuator 430 needs not switch. Thus, the service life of the actuator 430 can be increased. In addition, in the lens module 400 of the embodiment, only single cam 420 is used to achieve the purpose of automatic focusing, so the volume of the lens module 400 can be reduced.

Figure 8:
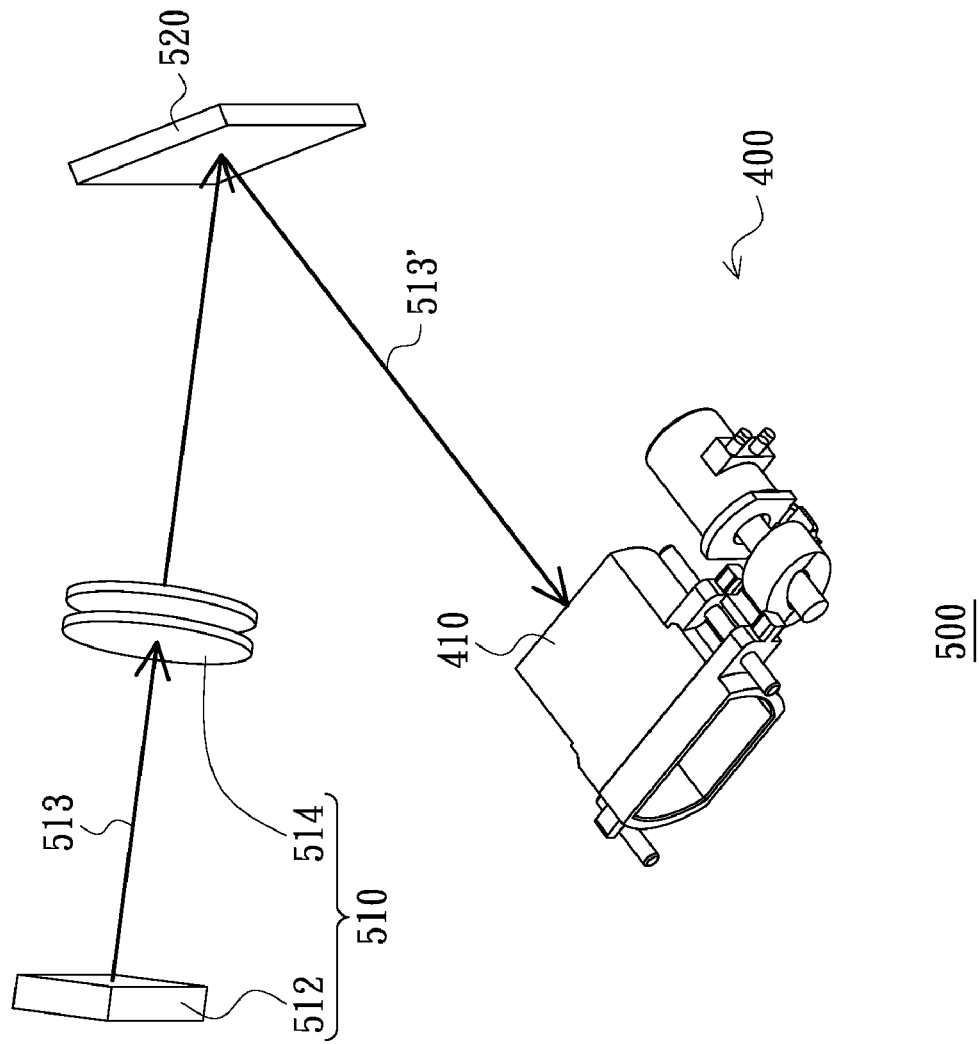
FIG. 8 is a schematic view of a projection device according to an embodiment of the invention.

FIG. 8 is a schematic view of a projection device according to an embodiment of the invention. Referring to FIG. 8, the projection device 500 of the embodiment includes an illumination system 510, a light valve 520 and a lens module 400. The illumination system 510 is adapted to provide an illumination light beam 513. The light valve 520 is disposed on a transmission path of the illumination light beam 513 and adapted to convert the illumination light beam 513 into an image light beam 513'. The lens 410 of the lens module 400 is disposed on a transmission path of the image light beam 513' and adapted to project the image light beam 513' onto a screen (not shown).

The illumination system 510 can include a light source 512 and a plurality of optical elements 514. The light source 512 is used to provide the illumination light beam 513. The optical elements 514 are used to focus the illumination light beam 513 on the light valve 520. The light source 512 can be a light emitting diode light source or a laser light source. Each of the optical elements 514 can be an optical lens, a reflector, a dichroic mirror or other suitable optical element. As shown in FIG. 8, the optical elements 514 are, but not limited to, optical lenses. In addition, the light valve 520 can be a reflective light valve, such as a digital micro-mirror device (DMD) or a liquid crystal on silicon panel (LCOS panel). In an alternative embodiment, the light valve 520 can be a transmission light valve. When the light valve 520 is a transmission light valve, a position relation of the illumination system 510 and the lens module 400 would be changed accordingly.

In the embodiment, because the lens module 400 can have the advantages of the improved reliability and the reduced volume, the reliability of the projection device 500 can be improved and the volume of the projection device 500 can be reduced. Consequently, the projection device 500 can be used in a micro-projector or built in a mobile device.

Figure 9:
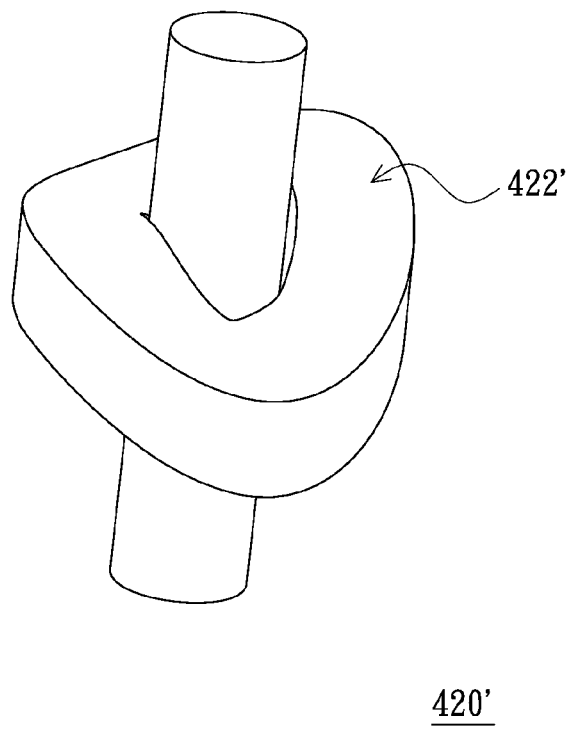
FIG. 9 is a schematic view of a cam according to another embodiment of the invention.
Figure 10:
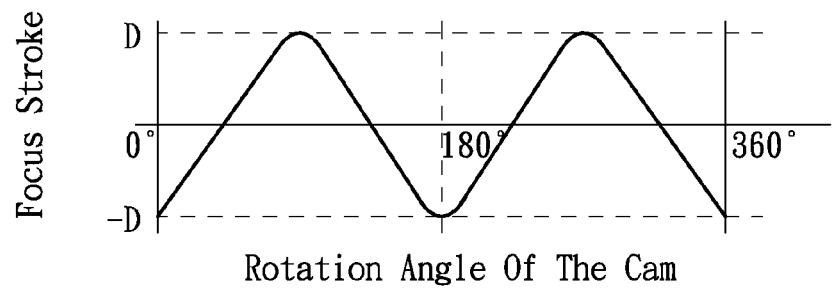
FIG. 10 is a diagram of a trajectory of a cam surface of the cam of FIG. 9.

FIG. 9 is a schematic view of a cam according to another embodiment of the invention. FIG. 10 is a diagram of a trajectory of a cam surface of the cam of FIG. 9. Referring to FIGS. 9 and 10, in the embodiment, each of the cam surfaces 422' is consistent with the formula $S=A|\cos T (2\pi X+\pi)|$ and T is equal to 2. In other words, when the cam 420' is rotated around once, the maximum and the minimum would appear twice respectively in the focus stroke. And thus, when the cam 420' is rotated around once, the lens would be moved back-and-forth twice in the predetermined range.

Figure 11:
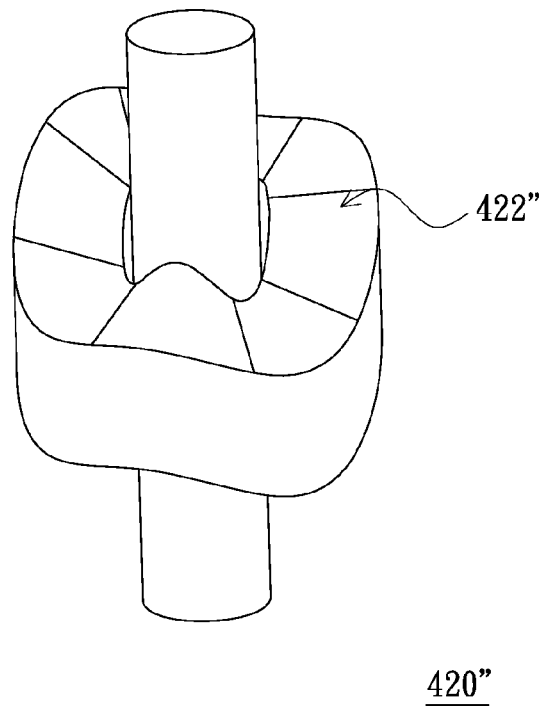
FIG. 11 is a schematic view of a cam according to another embodiment of the invention.
Figure 12:
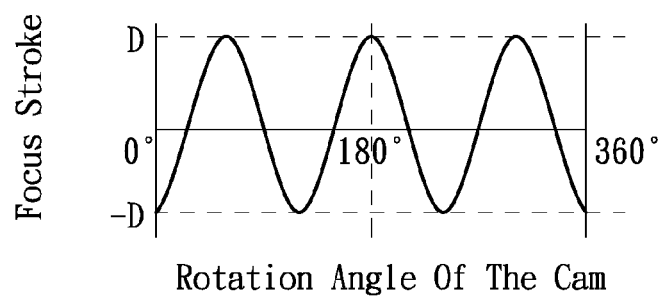
FIG. 12 is a diagram of a trajectory of a cam surface of the cam of FIG. 11.

FIG. 11 is a schematic view of a cam according to another embodiment of the invention. FIG. 12 is a diagram of a trajectory of a cam surface of the cam of FIG. 11. Referring to FIGS. 11 and 12, in the embodiment, each of the cam surfaces 422" is consistent with the formula $S=A|\cos T (2\pi X+\pi)|$ and T is equal to 3. In other words, when the cam 420" is rotated around once, and the maximum and the minimum would appear three times respectively in the focus stroke. And thus, when the cam 420" is rotated around once, the lens would be moved back-and-forth three times in the predetermined range.

The cam 420' and 420" of FIGS. 9 and 11 can be used to replace the cam 420 of the lens module 400 and utilized in the projection device 500.

In summary, the lens module and the projection device of the embodiments of the invention at least has one of the following advantages or other advantages.

First, while the cam is rotated, the cam can move the driven parts of the lens to make the lens move forward or backward in the predetermined range, and therefore the lens may not impact other components and the reliability of the lens module and the projection device of the invention can be improved.

Second, in comparison with the prior art, the lens module of the invention can not include the sensor, so the lens module of the invention has the advantages of simple structure and low cost.

Third, the cam surface of the cam can contact with the driven parts of the lens with the simple manner, and therefore the lens module of the invention can be assembled easily.

Fourth, in the invention, the movement of the lens can be controlled accurately by the cam surface, and the path of the movement of the lens is not easily to be changed even if they are used for the long time.

Fifth, in the invention, the rotation direction of the actuator needs not switch, so the service life of the actuator can be increased.

Sixth, only single cam is used to achieve the purpose of automatic focusing, so the volume of the lens module of the invention can be reduced. Therefore, the volume of the projection device can also be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens module, comprising:
   a lens having two driven parts disposed at one side of the lens;
   a cam disposed beside the lens and having a rotation shaft and two cam surfaces, a portion of the cam being located between the two driven parts, the two cam surfaces having the same shape and being on opposite sides of the cam, the two cam surfaces being in contact with the two driven parts respectively; and
   an actuator coupled with the rotation shaft and adapted to rotate the cam.

2. The lens module according to claim 1, wherein each of the cam surfaces is consistent with a formula $S=A|\cos T (2\pi X+\pi)|$, wherein S is a trajectory along a perimeter of the cam surface, A is a difference between a high level and a low level of the trajectory, Cos is a cosine function, $\pi$ is a ratio of the circumference of a circle to its diameter, T is a number of cycles of the trajectory, X is a parameter, and $0 \leq X \leq 1$.

3. The lens module according to claim 1, wherein the lens module further comprises a guiding structure, and the lens is coupled with the guiding structure and adapted to be moved along the guiding structure.

4. The lens module according to claim 3, wherein the guiding structure comprises two rods parallel with each other.

5. The lens module according to claim 3, wherein the guiding structure is parallel with the rotation shaft of the cam.

6. The lens module according to claim 1, wherein the actuator is a stepper motor, a direct current motor or a voice coil motor.

7. The lens module according to claim 1, wherein each of the driven parts is a protrusion structure.

8. A projection device, comprising:
   an illumination system adapted to provide an illumination light beam;
   a light valve disposed on a transmission path of the illumination light beam and adapted to convert the illumination light beam into an image light beam; and
   a lens module, comprising:
      a lens disposed on a transmission path of the image light beam and having two driven parts disposed at one side of the lens;
      a cam disposed beside the lens and having a rotation shaft and two cam surfaces, a portion of the cam being located between the two driven parts, the two cam surfaces having the same shape and being on opposite sides of the cam, the two cam surfaces being in contact with the two driven parts respectively; and
      an actuator coupled with the rotation shaft and adapted to rotate the cam.

9. The projection device according to claim 8, wherein each of the cam surfaces is consistent with a formula $S=A|\cos T (2\pi X+\pi)|$, wherein S is a trajectory along a perimeter of the cam surface, A is a difference between a high level and a low level of the trajectory, Cos is a cosine function, $\pi$ is a ratio of the circumference of a circle to its diameter, T is a number of cycles of the trajectory, X is a parameter, and $0 \leq X \leq 1$.

10. The projection device according to claim 8, wherein the lens module further comprises a guiding structure, the lens is coupled with the guiding structure and adapted to be moved along the guiding structure.

* * * * *